Sept. 12, 1967 R. G. KRAMER ETAL 3,341,852
TIME RECORDER WITH IDENTIFICATION BADGE
SCANNER AND READOUT LAMP
Filed July 21, 1965 8 Sheets-Sheet 1

ROGER G. KRAMER
EDWARD B. HILDUM
WILLIAM F. BOWIN
INVENTORS

ROGER G. KRAMER
EDWARD B. HILDUM
WILLIAM F. BOWIN
INVENTORS

FIG. 5

ROGER G. KRAMER
EDWARD B. HILDUM
WILLIAM F. BOWIN
INVENTORS

FIG. 6

ROGER G. KRAMER
EDWARD B. HILDUM
WILLIAM F. BOWIN
INVENTORS

ROGER G. KRAMER
EDWARD B. HILDUM
WILLIAM F. BOWIN
INVENTORS

ROGER G. KRAMER
EDWARD B. HILDUM
WILLIAM F. BOWIN
INVENTORS

ROGER G. KRAMER
EDWARD B. HILDUM
WILLIAM F. BOWIN
INVENTORS

FIG. 13

ROGER G. KRAMER
EDWARD B. HILDUM
WILLIAM F. BOWIN
INVENTORS

United States Patent Office 3,341,852
Patented Sept. 12, 1967

3,341,852
TIME RECORDER WITH IDENTIFICATION
BADGE SCANNER AND READOUT LAMP
Roger G. Kramer, Gardner, and Edward B. Hildum, Petersham, Mass., and William F. Bowin, Concord, N.H., assignors to Simplex Time Recorder Company, Gardner, Mass., a corporation of Massachusetts
Filed July 21, 1965, Ser. No. 473,734
3 Claims. (Cl. 346—14)

This invention relates to a time recorder and, more particularly, to apparatus arranged to record and accumulate such events as the arrival and leaving of employees in business establishments.

In the past, it has been standard practice, when an employee entered a manufacturing plant, to remove his time card from its rack, place it in the slot of a time recorder and have the time that he comes into work stamped on the time card. When he leaves the employment for the day, the process is performed again to show the time that he leaves. This card then becomes the basis for calculation of his wages. With the advent of computer bookkeeping, the extremely time-consuming labor operations needed to convert this time card into useful information for computing wages and making out checks is a drawback and a handicap in machine accounting. These and other difficulties experienced with the prior art systems have been obviated in a novel manner by the present invention.

It is, therefore, an outstanding object of the invention to provide a time recorder by which hours of employment are recorded and accumulated in a form acceptable to machine bookkeeping.

It is another object of this invention to provide a time recorder in which a conventional time card is used in cooperation with an employee badge to convert employment time into a form acceptable to a subsequent computer bookkeeping system.

A further object of the present invention is the provision of a time recorder of the type described which is simple in construction and which is capable of a long life of useful service with a minimum of maintenance.

It is another object of the instant invention to provide a time recorder which records on an elongated paper tape the time of day, the date, an indication of the particular employee and of the particular recorder involved, and other information in a sequential form for use in automatic bookkeeping.

It is a further object of the invention to provide a time recorder including a badge identification apparatus.

A still further object of this invention is the provision of a time recorder having a time encoding apparatus, which encoding apparatus operates as a slave to a major time stamp clock and in which means is provided for automatically pulsing the time recorder at frequent intervals to keep it in step with the clock.

It is a still further object of the present invention to provide a time recorder in which information is received from an employee badge and from a supervising clock; this information is used to stamp a time card and to make a binary record of the information for wage calculation purposes.

With these and other objects in view, as will be apparent to those skilled in the art, the invention resides in the combination of parts set forth in the specification and covered by the claims appended hereto.

The character of the invention, however, may be best understood by reference to one of its structural forms, as illustrated by the accompanying drawings in which.

Before beginning a description of the specific apparatus, it seems appropriate to discuss the problems which the present invention solves. The time recorder of the invention is a machine for recording a person's hours of employment, for instance, and is specifically arranged to meet the trend toward automation of wage calculating operations. In order to automate such functions, it has been necessary to design a machine which is compatible with existing machines and, therefore, first of all, produces time cards which meet union demands and state statutes. The machine also must use this data in a manner useful to a computer. The time recorder produces a punched paper tape, which medium was selected to record the time data because of its low cost and because of its widespread usage as a data input to bookkeeping computers. The apparatus, therefore, includes a time punch to stamp a time card and punched tape producing equipment to produce the ultimate tape product.

Before describing the actual machine, it may be well also to discuss the concepts of automation and of computers as used in business today and, specifically, as they might be used in the field of time-recording and wage calculation. A computer is basically not a very intelligent machine; it does not do any original thinking and does not do anything that it is not told to do. In the broad sense, a computer is an assembly of components placed together to perform a prescribed cycle of functions. Sometimes it is set up in such a manner as to perform a routine when commanded to do so and sometimes it is told to proceed along a predetermined path. In the simplest sense, computers are used in the household; for instance, the automatic washer is a computer because it goes through a certain routine when you tell it to. It turns on valves, shifts gears, starts the motor and stops. The program routine, however, was determined by the manufacturer and is only set in motion by the housewife.

In automating the wage computation process, some of the advantages involved would be:

(a) Saving money by cutting the work staff,
(b) Saving time by doing the process faster, and
(c) Expanding the mount of work done by a present work staff.

A main object might be to use a computer to prepare pay checks, for employees. In preparing such pay checks, the apparatus must go through the same routine as a person personally preparing a check. A typical procedure which might be used in preparing pay checks is as follows:

(1) Time cards are prestamped with the employee's number.

(2) The employee's name is sometimes added to the time card to facilitate card selection in a rack.

(3) Time cards are then grouped according to the various departments.

(4) A person then hand distributes these packets of cards to their respective departments for future insertion into the card racks.

(5) The cards are again sorted and inserted in some prescribed sequence (either alphabetically or numerically) into the card rack.

(6) The cards are punched by the personnel for the period allotted, for instance, one week; it should be noted that there is always the possibility of someone punching the wrong card which requires a troublesome correction by an authorized person.

(7) The cards are then picked up by a department employee and, possibly, checked for validity.

(8) The cards are eventually returned to the central accounting department where new cards are distributed for the next pay period.

(9) The cards are then sorted in same sequence.

(10) The cards are audited to assign correct time, cutting recorded excess time down to standard time and verifying the excess overtime with authorized overtime. At this stage, the preparation of pay checks begins.

(11) An employee's accounting record is used to determine the pay rate, tax rate, miscellaneous deductions, etc. The actual calculation might be by hand with entries on a standard work sheet and actual arithmetic done manually or on a calculating machine.

(12) The actual pay check can then be made out by hand.

(13) The checks are then sorted in a manner similar to the time cards.

(14) The checks are then hand carried to each department.

(15) Each department then distributes the checks. As may be seen, the timekeeping function may become quite extensive as the number of employees grows. Since it is a manual procedure, it is subject to error and may take considerable time and work to perform.

How does the present invention reduce the above procedures First of all, we have the problem of time cards and the machine. Numerous state laws or union agreements require that hourly employees must have their hours of employment recorded in some manner. The standard time card has evolved over the years and meets this requirement satisfactorily. It does give the employee a means of quickly checking his punctuality and checking indirectly the functioning of the time-recording mechanism. Because of its entrenchments in the time recording field, it is necessary that an automatic time recorder also provide this "time card" stamping function. However, the time card is not in a form usable in automated time recording accounting. Several schemes have been attempted in the past, for instance, by punching the time card in the manner of an IBM card. The success of this process has been limited because of mechanical tolerances and incompatibility with all of the data processing computers presently available. Most data processing systems have provision for using a five- or eight-channel paper tape, either directly as an input or indirectly by conversion to appropriate inputs such as a card or magnetic tape. For instance, the well-known IBM 1301 system has an apparatus for converting a paper tape coding to punched card for use in their computer.

In automating a timekeeping system, a person would periodically pick up the reel of paper tape covering the particular payroll period. These reels are then processed through a converting machine. The resultant data would then be fed into the computer where all functions from steps 8 to 14 above are performed automatically at high speed and, in addition, prepares the time cards for the coming period. Then, during the next periodic pickup of reels, the pay checks and time cards would be distributed. It might be added here that the manual distribution of checks may be eliminated by machine insertion into envelopes for direct mailing.

Now, with regard to the present invention, why is it necessary to have a badge. In the manual preparation of time cards, personnel identification has been manually added to each card. However, in the preparation of paper tape, no such entry is on the paper tape so, instead, a badge is used to enter the employee's number with the recorded time. Such a badge could be used additionally to identify the employee at a point of entry into the company's premises and (in government oriented projects) color coded to serve as security identification.

Referring first to FIGS. 1, 2, 3, and 4, which best show the general features of teh invetnion, it can be seen that the time recorder, indicated generally by the reference numeral 10, is provided with a generally box-like housing 11 adapted to be mounted in suspension on a vertical wall. It is provided with an inclined upper surface 12 having a time card slot 13 and a badge slot 14. A stainless steel panel 15 forms part of the housing at this point. The entire outer portion of the housing is retained in place by a key-operated lock 16. Mounted in a row at the forward edge of the upper surface 12 are an "IN" button 17, an "OUT" button 18, and three "SHIFT" buttons 19, 21, and 22 indicating, respectively, the first shift, the second shift, and the third shift. Mounted on the upper surface rearwardly of these buttons is a hinged access door 23 maintained in place by a key-operated lock 24. Located at the upper part of the front surface of the housing 11 is a clock window 25. In the lower part of the front surface of the housing is located a hinged access door 26 maintained in place by key-operated locks 27 and 28.

Figure 1:
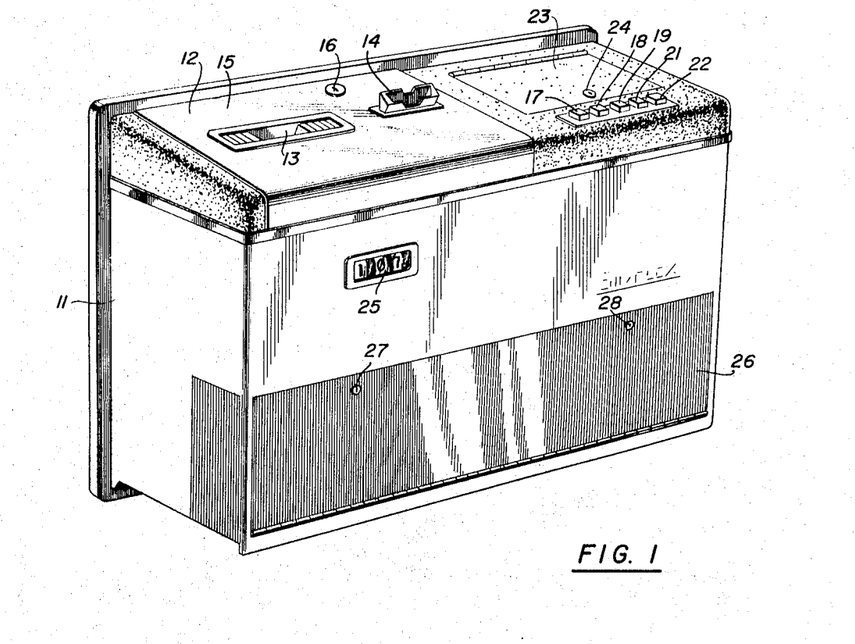
FIG. 1 is a perspective view of a time recorder embodying the principles of the present invention.
Figure 2:
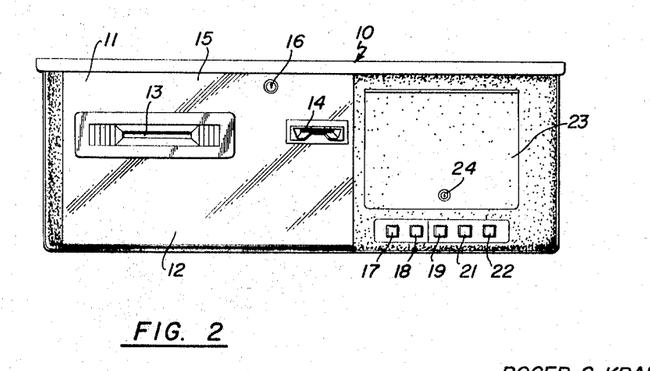
FIG. 2 is a plan view of the recorder.
Figure 3:
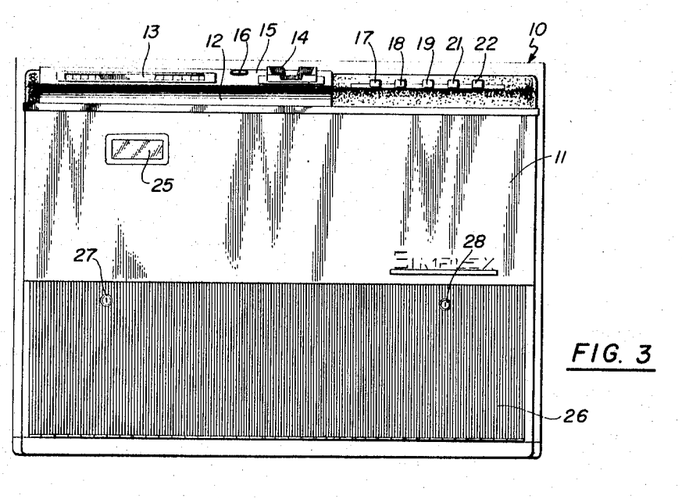
FIG. 3 is a front elevational view of the time recorder.
Figure 4:
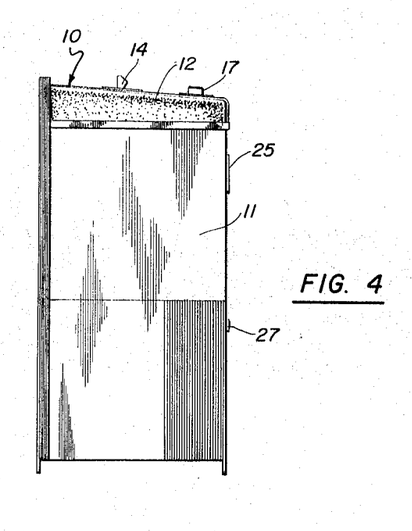
FIG. 4 is a side elevational view of the time recorder.
Figure 5:
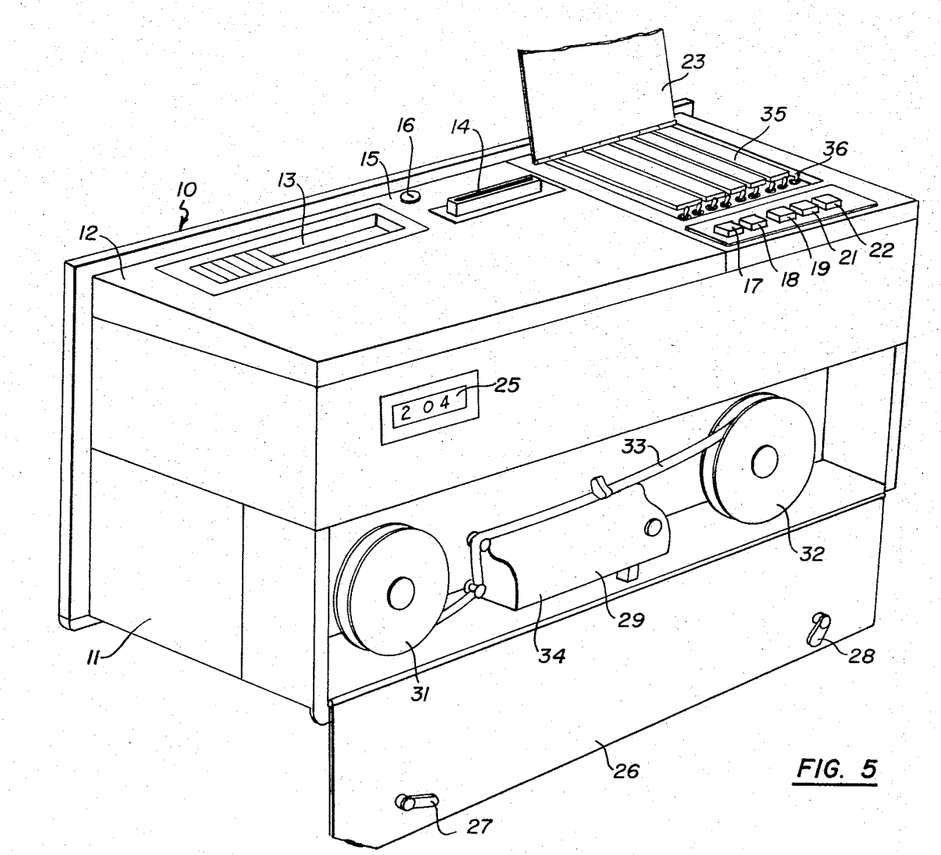
FIG. 5 is a perspective view of the recorder with certain panels opened.

Referring next ot FIG. 5, it can be seen that, when the access door 26 is opened by releasing the locks 27 and 28, there is revealed within the housing 11 a tape punching 29. This mechanism consists of a first reel 31, and a second reel 32 between which extends a standard paper tape 33 intended for use in the recording of binary coded material for use in a computer. Between the two reels extends the punching mechanism 34 through which the tape 33 is guided. The punching mechanism 34 is of the conventional type which produces circular holes in a five- or eight-channel paper tape in response to coded electrical signals and, since such devices are conventional in the field, it is not felt to be necessary to describe it in detail.

Also in FIG. 5 it can be seen that, when the access door 23 is lifted, the interior of the housing is revealed to show a series of time-date readout lamps 35 and a row of switches 36 whose purpose will be described more fully hereinafter.

Figure 6:
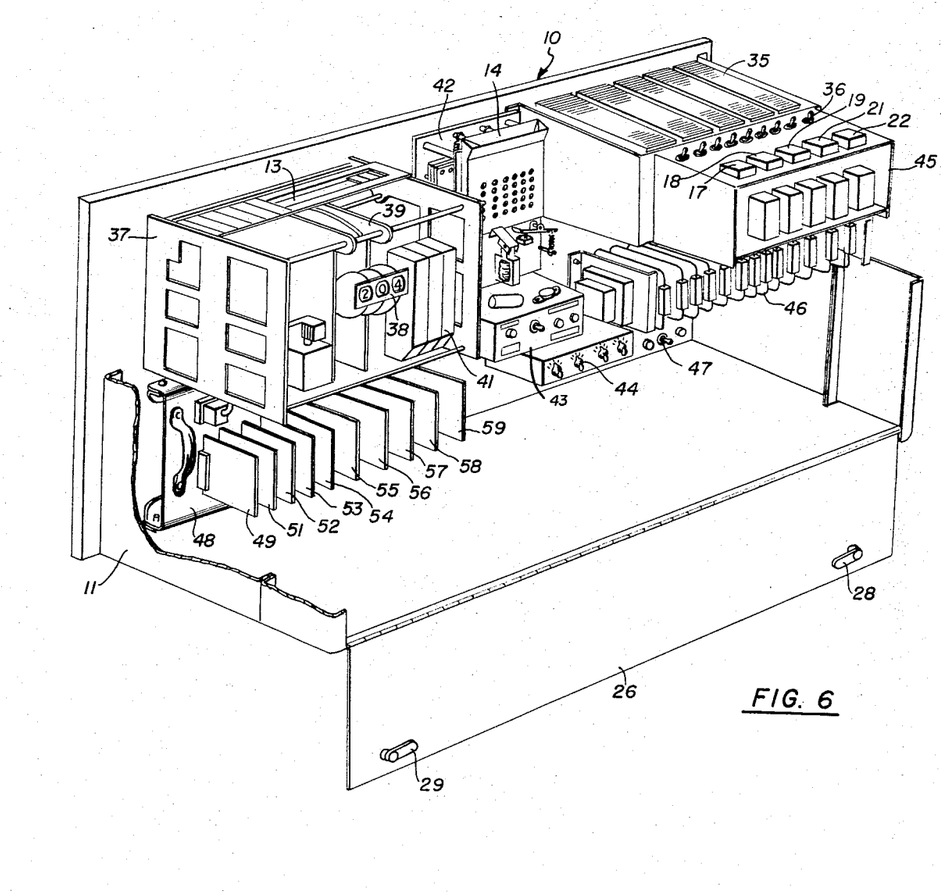
FIG. 6 is a perspective view of the interior of the time recorder with portions removed.

FIG. 6 shows the time recorder 10 with the outer portion of the housing 11 removed and with the tape punching mechanism 29 also removed. Mounted within the housing 11 is a conventional time unit such as a time card printer 37 having the time card slot 13 located in its upper portion. This time card printer includes a supervising clock 38 having an indicating means showing through the window 25 (see FIG. 5). This supervising clock 38 is of the type shown in the patent of Blouin No. 2,575,090. Forming part of the printer 37 is a time stamp 39 of the type shown in the patent of Deane et al. No. 2,355,514, and operated by the clock 38. Also operated by the clock 38 is a bead-chain type programmer 41 of the type shown in the patent of Blouin No. 2,591,335. Mounted on the back panel of the housing beside the time card printer 37 is a badge reader 42 formed with the badge slot 14 facing upwardly thereof. Mounted under the badge reader is an electrical power supply 43 and a set of switches 44. Mounted on the back panel of the housing beside the badge reader 42 is a time-date unit 45 carrying the switches 17, 18, 19, 21, and 22 and as well as the switches 36 and the time-date readout lamps 35. Underlying the unit 45 is a motor-driven scanner 46 and a time-date readout switch 47. The scanner consists of a series of printer circuits, generally in the form of commutator segments, all mounted in spaced, parallel relationship, and contacted by sweep brushes rotatably mounted on a common shaft operatively connected to the drive motor. Underlying the time card printer 37 and attached to the back panel of the housing 11 is a wiring panel 48 to the front of which are attached a number of transistorized and printed circuits consisting of removable and replaceable units mounted in parallel vertical planes. Among these amplifier panels 49, 51, and 52. An encoder panel 53 is located next and then six decoder panels 54, 55, 56, 57, 58, and 59.

Figure 7:
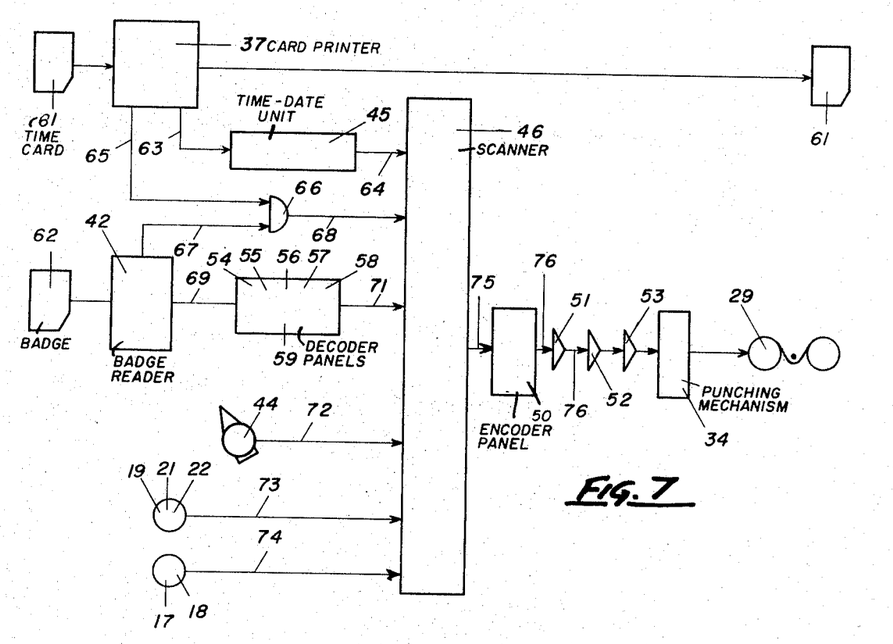
FIG. 7 is a schematic diagram of the electrical interconnections of the parts.

FIG. 7 shows in a schematic diagram the manner in which the various elements of the time recorder 10 are electrically related. The time card printer 37 is adapted to receive a time card 61. Similarly, the badge reader 42 is adapted to receive a badge 62. The insertion of the time card 61 in the time card printer 37 results in a stamped time card 61', but the inesrtion of the badge 62 into the badge reader 42 produces no physical effect on the badge. The time card printer 37 is connected by a line 63 to the time-date unit 45 whose output, in turn, is connected by a line 64 to the input side of the scanner 46. The time card printer 37 is also connected by a line 65 to the input side of an AND logic unit 66. Similarly, the badge reader 42 is connected by a line 67 to the input side of the logic unit 66. The output side of the logic unit is connected by a line 68 to the input side of the scanner 46. The badge reader 42 is also connected by a line 69 to the input side of the decoder panels 54, 55, 56, 57, 58, and 59, the output of which is connected by a line 71 to the input side of the scanner 46. Similarly, the switches 44 are connected by a cable 72 to the scanner to deliver signals indicating the number of the machine or the time recorder location in the business establishment. The shift buttons 19, 21 and 22 are connected by a cable 73 to the input side of the scanner 46. Similarly, the IN and OUT switches 17 and 18 are connected by a cable 74 to the input side of the scanner 46. The output of the scanner 46 is connected by a line 75 to the input side of the encoder panel 50 whose output is connected by a line 76 through the pre-amplifiers 51 and 52 and the main amplifier 53 to the punching mechanism 34 forming part of the tape punching mechanism 29.

Figure 8:
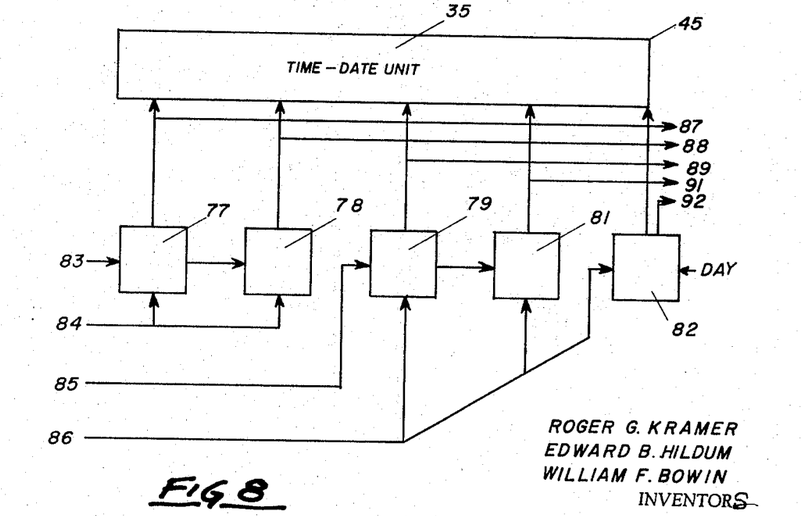
FIG. 8 is an electrical schematic of a certain portion of the recorder.

FIG. 8 shows the arrangement of the time-date unit 45. The readout lamps 35 are connected to stepping switches 77, 78, 79, 81, and 82. The unit receives pulses from the supervising clock 38 of the time card printer 37 through the lines 83, 84, 85, and 86. The stepping switch 77, for instance, is the "hour x 0.01" switch, the switch 78 is the "hour x 0.1" switch, the switch 79 is the "hour x 1.0" switch, the switch 81 is the "hour x 10" switch, while the switch 82 is the "day" switch. These switches operate the bank of time-date readout lamps 35 and, in addition, pass signals indicative of time through cables 87, 88, 89, 91, and 92 through the cable 64 to the scanner 46.

Figures 9, 10:
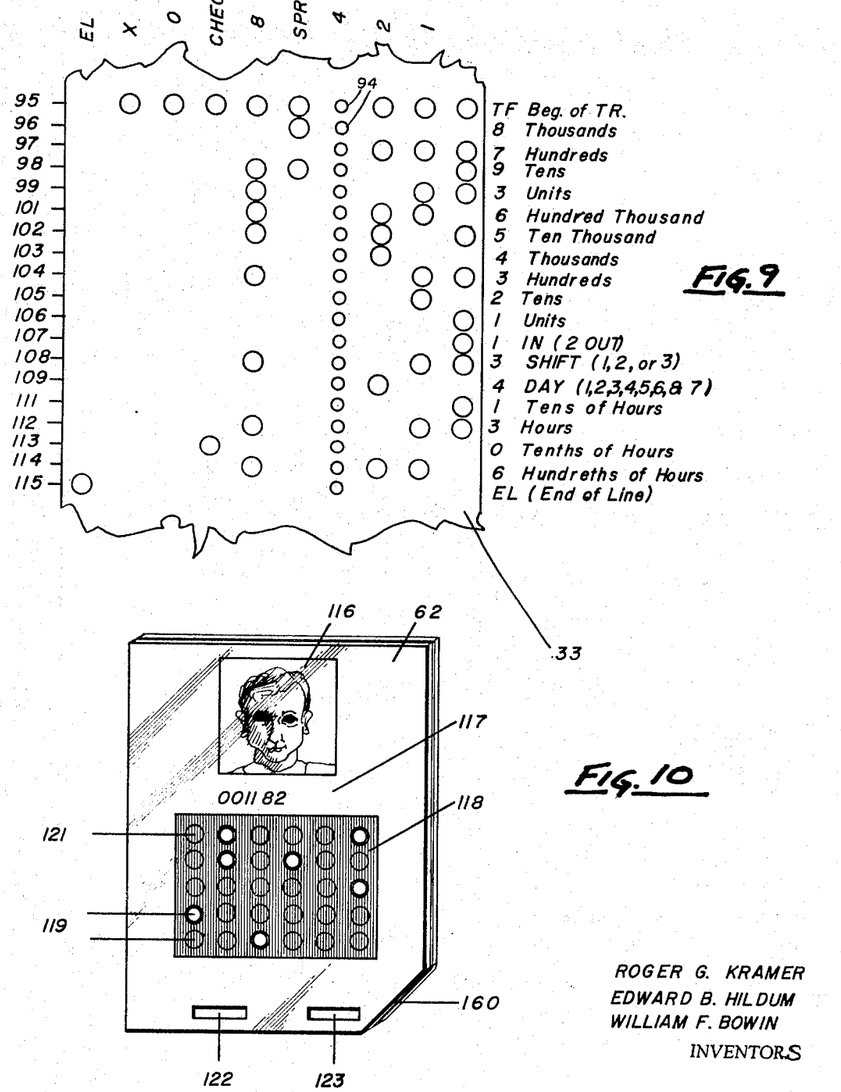
FIG. 9 is a view of a portion of a punched tape which is the product of the recorder.
FIG. 10 is a perspective view of an employee badge used in the time recorder system.

FIG. 9 shows a section of a typical punched tape produced by the present invention. The tape 33 is an eight-channel tape and the length shown is that occupied by a typical single entry. The row of apertures 94 constitutes only a gripping means for the machine sprocket. As is evident from the drawing, the first transverse row 95 merely shows the beginning of a transaction. The next four rows 96, 97, 98, and 99 indicate in binary form the machine number in thousands, hundreds, tens, and units, these four rows permitting the number of separate time recorders in a given plant to be as high as 9,999. The next six rows 101, 102, 103, 104, 105, and 106 give the badge number of the employee in hundred thousands, ten thousands, thousands, hundreds, tens, and units, so that the machine will handle up to 999,999 employees.

The next row 107 indicates whether the employee is punching "IN" or "OUT." The next row 108 indicates the number of the shift, i.e., either first, second, or third. The next row 109 indicates (in the binary system) the day of the week. The next rows 111, 112, 113, and 114 indicate the time of day in tens of hours, hours tenths of hours, and hundredths of hours, indicating time, of course, up to 2,400 hours. Finally, the last row 115 is punched to indicate the end of the particular transaction or entry.

FIG. 10 shows a typical employee badge 62 constituting a laminated plate of clear plastic. Laminated between two layers of plastic is a photograph 116 of the employee and under it his identification number 117. Between the two layers of clear plastic is also laminated a generally square-shaped opaque metal plate 118 and the two laminated plastic sheets are provided with 30 matching apertures 119 arranged in six rows of five apertures each. The metal plate 118 originally is not provided with apertures, but some of the apertures, such as the aperture 121, is punched through the plate 118 so that a passage extends entirely through the badge 62 in that position. In this way, by using the binary coding system, the identification number 117 is represented by punched holes. At the bottom of the plate are provided two thin, narrow apertures 122 and 123 for a purpose to be explained hereinafter.

Figure 11:
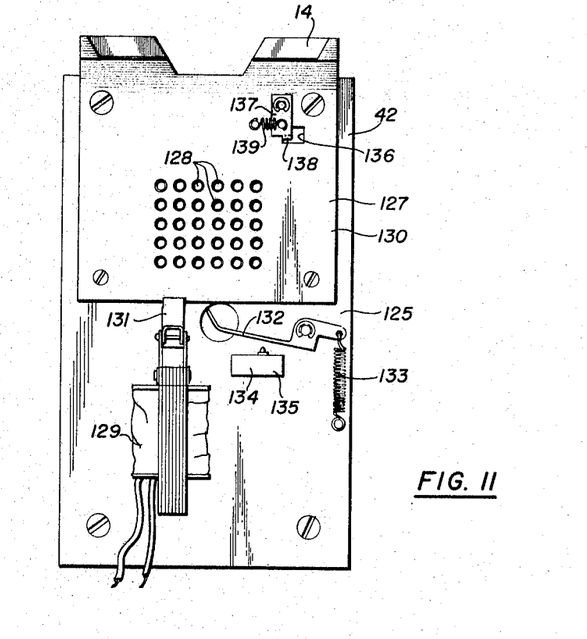
FIG. 11 is a front elevation of a badge reader.
Figure 12:
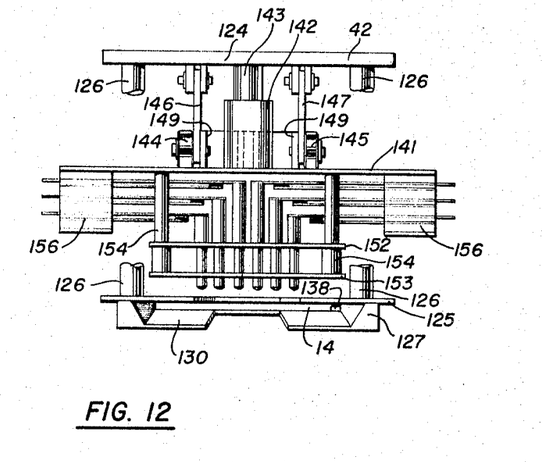
FIG. 12 is a plan view of the badge reader.
Figure 13:
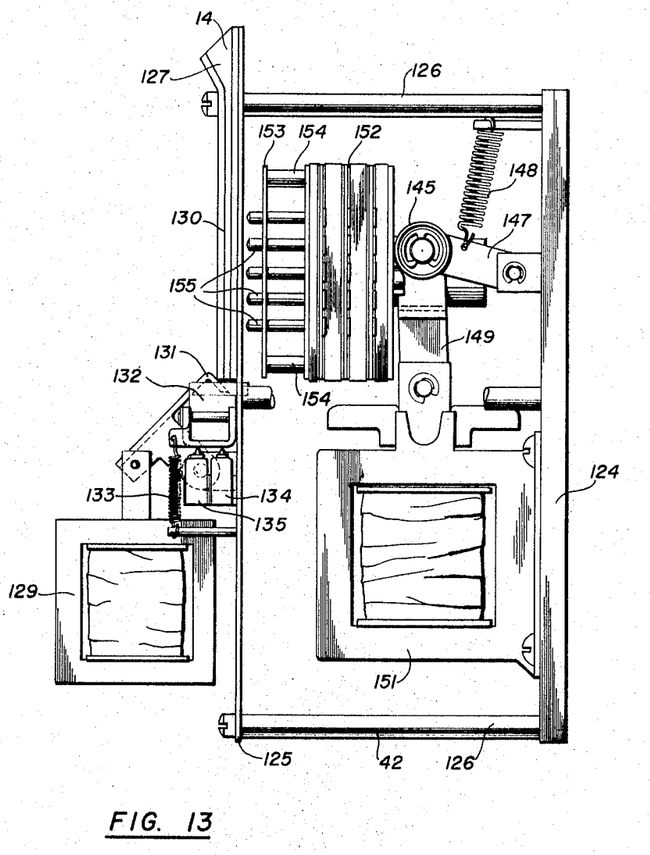
FIG. 13 is a side elevational view of the badge reader.

FIGS. 11, 12 and 13 show the details of the badge reader 42. It is provided with a frame made up of a back plate 124 of substantial thickness, a front plate 125 of relatively thin material joined by and held in parallel, spaced relation by posts 126. Mounted on the front surface of the front plate 125 at the upper portion thereof is a badge receptor 127 made up of plates held together by screws to define the badge slot 14. Portions of the receptor are flared around the slot to permit each entrance of the badge 62. The front plate 130 of the receptor is provided with perforations 128 arranged in the same pattern as the perforations 119 in the badge 62. The front plate 125 is provided with matching apertures (not shown). Also mounted on the surface of the front plate 125 below the receptor 127 is a solenoid 129 having a latch 131 mounted on its plunger and adapted to engage the slot 122 in the badge 62. The latch 131 is spring-biased toward the plate 125 and rests against it when it is not engaged in the slot 122 of the badge. The latch is withdrawn by downward movement of the plunger of the solenoid, when the solenoid is energized. Also mounted on the front plate 125 is a pivoted finger 132 which is normally biased to an upward position by a coil spring 133. Underlying the finger are two microswitches 134 and 135.

The upper part of the receptor 127 is provided with a rectangular aperture 136 over which lies a hinged lever 137. The bottom of the lever has a small finger 138 which extends through the aperture 136 into the interior of the slot 14 at the right-hand side The lever 137 is biased to the left by a coil spring 139 so that the finger 138 is spring-biased against the side of the badge 62 while the badge is in the slot 14 This finger also ensures that the badge be presented to the slot with a bevel 160 at the right side.

Lying between the plates 124 and 125 and extending transversely thereof behind the apertures 128 is a plate 141 having a tube 142 mounted on its rear surface. Slidable in this tube and having the same diameter as the inner diameter thereof is a piston 143 extending forwardly from the plate 124. The tube 142 and the piston 143 form a guide and support means for backward and forward movement of the plate 42. This movement takes place because of contact with the plate of wheels 144 and 145 which are mounted at the ends of levers 146 and 147, respectively, the other ends of the levers being hingedly connected to the plate 124. The lever 147 is spring-biased to an upper position by a coil spring 148 and the lever 146 is similarly biased. The lower ends of the levers 146 and 147 and the wheels 144 and 145 are pivotally connected to a bifurcated plunger 149 of a solenoid 151 mounted on the back plate 124.

Between the plate 141 and the front plate 125 lie two somewhat shorter transverse plates 152 and 153 held in spaced parallel relationship to each other and to the plate 141 by posts 154. These plates are provided with apertures in the same pattern as the apertures 128 in the receptor 127. In these apertures are slidably carried feeler fingers 155 which normally lie in the retracted position shown in FIG. 12, but, when the solenoid 151 is energized, are projected toward the apertures in the receptor 127. The rearward end of each of the fingers 155 engages one of the switches 156. Each of the fingers 155 is provided with a relatively large rear portion and a relatively small front portion and the plates 152 and 153 are provided with holes of the same diameter as the small portion of the finger; this relationship retains the fingers in place in sliding relationship.

The operation of the badge reader will now be readily understood, in view of the above description. The badge 62 is pressed downwardly into the slot 14 of the receptor 127 by the employee. The bevelled corner 160 strikes the finger 138 of the lever 137, thus assuring proper orientation of the badge. Subsequently, the pressure of the finger is brought to bear along the right-hand edge of the badge. This causes the badge to occupy a position to the extreme left in the slot. Eventually, the card reaches the bottom of the slot and the apertures 119 are aligned with the aperures 128 in the receptor 127. At that time, the lower edge of the badge has engaged the latch 131 which falls into the aperture 122 of the badge and locks the badge in place. At the same time, the bottom edge of the badge engages the finger 132 which moves downwardly and engages the switches 134 and 135 to close them. When the badge is in place and the switch 134 is closed and when the time card is passed into the slot 13 and another switch (not shown) is operated, the solenoid 151 becomes energized so that its plunger 149 is retracted downwardly. This carries the levers 146 and 147 with their wheels 144 and 145 with them. This movement causes the plate 141 to move forwardly with the plates 152 and 153 and the contact fingers 155. Some of the fingers 155 will pass through the apertures 128 in the receptor as well as the open apertures 121 in the badge. Some of the fingers 155, however, will strike the central lamination plate 118 of the badge in the area of an aperture 119 where the plate 118 is not punched. Therefore, it will not be able to pass entirely through the apertures 128. In that case, the finger remains behind, while the rest of the assembly with the plate 141 continues to move forwardly. This causes that particular finger 155 to close its switch 156 so that the switches which are closed and those which remain open give a binary indication of the employee's identification number which may be transmitted to the scanner portion of the time recorder for use, as will be described hereinafter. When the operation has been completed, a switch (not shown) is closed to permit the solenoid 129 to be actuated so that its plunger moves downwardly and carries the latch 131 forwardly out of the slot 122 in the badge, so that the badge is free to be lifted out of the slot 14 by the employee.

The operation of the time recorder 10 will now be described in general. Basically, the machine consists of the time card printer 37, the badge reader 42, the time-date unit 45, the scanner 46, the punching mechanism 34, the encoder 53, and the decoders 54 to 59. Each of these units is individually packaged for easy maintenance and for removal. The wiring panel serves to interconnect all the units by means of cables and connectors. The time card printer 37 provides sequential time data to the time-date unit 45 by means of cams and is interlocked so as to assist in starting the time recording function. In the process, both the time card 61 and the badge 62 must be seated in their respective slots 13 and 14 to start the recording process. Once started, the time card 61 is stamped with the time exactly as in prior art devices and may be immediately removed. The badge 62 is retained in the badge reader 42 for a fraction of a second until its data may be entered on the tape 33. The sequential time data provided by the time card printer and its supervising clock 38 is converted into decimal form in terms of days, tens of hours, hours, tenths of hours, and hundredths of hours in the time-date unit 45. The time-date unit is initially set to read the same as the clock 38 by use of the lamp readout 35 and the switches 36 associated therewith. The clock 38 transfers the following pulses to the time-date unit 45: a few-second-duration minute pulse occurring at the start of each minute; a few-second-duration minute correction pulse occurring at approximately 15 seconds past the 45th minute; a few-second-duration hourly impulse; and a minute-duration daily impulse occurring at the start of the first minute after midnight. This last impulse provides, in addition, the hourly correction.

The time-date unit 45 consists of the five stepping switches 77, 78, 79, 81 and 82 arranged in three groups as shown in FIG. 8. Each time the switch 77 repeats its sequence, a carry signal is transferred to the "hour x 0.1" stepping switch 78 which steps decimally. At the 15 seconds past the 45th minute (or 0.75 hour), a minute correction signal homes these switches to the 45th minute. No matter how fast or how slow the time-date unit might have been, it is set correctly at this time. The "hour x 1.0" stepping switch 79 will step at each hour impulse, thus providing a decimal output with a carryover to the "hour x 10" switch 81. Its correction occurs at one minute past the 24th hour to eliminate the possibility of dual commands occurring on the hour.

This hour correction pulse is the "day" pulse. The "day" stepping switch 82 steps from 1 to 7 and repeats. There is only a manual "day" correction pulse as provided on the control panel. It would be difficult to provide a "day" correction pulse from the clock 38 which, by the way, is corrected manually in the present case but might be the slave of a master clock-secondary clock correction system of the type which is well known. The same data as is read out on the lamp display 35 is stamped on the time card 61, and is shown through the window 25 of the housing and is fed to the scanner 46 for appropriate sampling. The readout display 35, incidentally, may be shut off by a switch on the panel to lengthen lamp life. With the readout operated only during the initial and periodic synchronization maintenance, the lamp life should be indefinitely long.

The badge reader 42, of course, operates in conjunction with the decoders 54 through 59. In the preferred embodiment, there are six numbers on a badge and each number has been coded in the badge to conserve badge space. It is necessary to code each number to decimal digits to be compatible with other information being scanned by the scanner 46 and fed onto the tape. On the badge, there are six columns representing six numbers and five rows required for coding. Each number requires its own decoder and each decoder consists of ten AND gates corresponding to the ten decimal digits driven by the badge switch and associated inverter. The AND gates sense the particular code corresponding to its assigned number. In assigning badge numbers, the right-hand side, in a preferred embodiment, always stands for units and decade steps progress to the left. All unused numbers are filled with zeroes. In combination with a badge number, are four additional numbers which may be used in several ways and by means of the switch 44. They may be separate department numbers for the purpose of cost breakdown, by accounting, or they may serve as the number of the machine recording the time-date.

The switches 17, 18, 19, 21, and 22 provide a means of introducing the information as to "shift" and "mode," i.e., "IN" or "OUT" and first, second, and third shift. The individual using the time recorder will either set these buttons properly or they will have been set by the person who operated the machine ahead of him.

All of the above data is sampled by the scanner 46. Each scanner disc scans a particular channel. One scanner disc provides the synchronizing signal for the punched tape. The scanner also provides cam closures which interlock the scanner motor for a full scanning cycle, operate the badge reader solenoid, operate the badge release solenoid, provide a starting signal for a tape-to-card converter (if such is used), and provide a stop signal for the tape-to-card converter. There are twenty points on the scanner board, nineteen of which are used, since the scanner comes to a stop at the twentieth point. The decimal data output for the scanner is converted by the encoder 53 to any code desired. The encoder consists of an array of diodes, whereby the channels corresponding to a decimal digit (as described by a code) are driven when the digit is activated. Code changes are made by changing the encoder printed circuit board. The resulting coded output is amplified and punched onto the paper tape by the punching mechanism 34. Three amplifiers 51, 52, and 53 are required. The first and second operate together to minimize the loading on the coder by means of the scanner and the encoder, while the signal remains non-inverted. The last amplifier provides the high voltage switching required for the punch magnets. A scanner board provides the signals to operate the punch while some scanner contacts provide time sequential start-and-stop information on the tape as required by the usual taped-to-card converters.

In the preferred embodiment, the machine has twenty scanned points, although only nineteen of these are available for data entry, because the scanner stops on the twentieth point. Two of these nineteen points are used for commanding signals. This leaves seventeen data points. An arbitrarily selected code is shown on the paper tape 33 of FIG. 9. This coding is compatible with the IBM type 047 tape-to-card converter used with the IBM 1401 computer. This information order is wired into the machine and cannot be easily changed because of the complexity of the wiring. One could, of course, provide the user's selected format going to the accounting computer by using a manually-operated cross bar switch, but this would increase the cost considerably.

It can be seen that the present invention provides a number of advantages. The tape is easily accessible through the front door 26. The time-date readout is in decimal form, so that the time and date printed on the time cards 61 may be directly compared to the readout 35 for initial installation. The upper portion of the housing 11 is easily removed to permit access to the inside of the machine. This is locked in place, however, to prevent unauthorized access. Its removal does not affect the operation of the system in any manner as there are no parts or wires attached to the housing. The entire time recorder has been made in the modular form to minimize the downtime of a machine due to maintenance. This means that the cause of any trouble in a machine may be localized to a particular module which may then be quickly replaced. Later, this module may be repaired at leisure in the field office or sent to the home office for repairs. Code changes in the tape punching operation are easily brought about by exchanging the encoder printed circuit board. This makes it possible readily to adapt the machine to a different type of computer in a data processing installation, or to farm out some of the time recording data processing to other computing centers when work loads so demand.

Minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A time recorder for use with a time card and an identification badge to produce a tape record for computer accounting, comprising (a) a time stamp including a clock, having a slot into which the time card is inserted, and having means to stamp a visual record on the time card,
(b) a time-date unit receiving electrical pulses from the clock and converting them to signals indicative of time,
(c) a badge reader having a slot into which the identification badge is inserted and producing coded signals indicative of identification,
(d) a decoder to which the badge reader is connected to convert the said coded signals to signals having the same nature as the said signals indicative of time,
(e) a first means producing a signal indicative of start or finish of a time period,
(f) a second means producing a signal indicative of shift,
(g) a tape punching mechanism,
(h) a motor-driven scanner receiving signals from the time-date unit, the decoder, the first means, and the second means,
(i) an encoder connected between the scanner and the tape punching mechanism, the scanner presenting the signals sequentially to the encoder, and
(j) means to insure that no signals are passed by the scanner unless both the time card and the identification badge have been inserted in their respective slots.

2. A time recorder for use with a time card and an identification badge to produce a tape record for computer accounting, comprising (a) a time stamp including a clock, having a slot into which the time card is inserted, and having means to stamp a visual record on the time card,
(b) a time-date unit receiving electrical pulses from the clock and converting them to signals indicative of time,
(c) a badge reader having a slot into which the identification badge is inserted and producing coded signals indicative of identification,
(d) a decoder to which the badge reader is connected to convert the said coded signals to signals having the same nature as the said signals indicative of time,
(e) a first means producing a signal indicative of start or finish of a time period,
(f) a second means producing a signal indicative of shift,
(g) a tape punching mechanism,
(h) a motor-driven scanner receiving signals from the time-date unit, the decoder, the first means, and the second means,
(i) an encoder connected between the scanner and the tape punching mechanism, the scanner presenting the signals sequentially to the encoder, and
(j) readout lamps provided to give a visual indication of the signals indicative of time to permit comparison with the said clock.

3. A time recorder as recited in claim 2, wherein means is provided to assure that the identification badge cannot be removed from its slot in the badge reader until the scanner has passed decoded signals indicative of identification to the encoder.

References Cited

UNITED STATES PATENTS

| | | | |
|---|---|---|---|
| 2,338,180 | 1/1944 | Harrison | 346—53 |
| 2,545,460 | 3/1951 | Hall | 346—54 |
| 2,988,269 | 6/1961 | Reichert | 346—52 |
| 3,109,088 | 11/1963 | Lyner | 346—60 |

RICHARD B. WILKINSON, *Primary Examiner.*

M. LORCH, *Assistant Examiner.*